United States Patent [19]
Royal et al.

[11] 3,903,873
[45] Sept. 9, 1975

[54] PULSE CONTOUR MEASURING INSTRUMENT

[76] Inventors: Douglas E. Royal, 1341 Via Cataluna, Palos Verdes Estates; Jess L. Sevy, 4939 Golden Arrow Dr., Palos Verdes Peninsula; Gustave Solomon, 7215 Hillside Ave., No. 48, Los Angeles, all of Calif.

[22] Filed: May 13, 1974

[21] Appl. No.: 469,300

[52] U.S. Cl............................ 128/2.05 P; 128/2.05 T
[51] Int. Cl.²........................................ A61B 5/02
[58] Field of Search ...... 128/2.05 P, 2.05 E, 2.05 S, 128/2.05 T, 2.05 R, 2 K

[56] References Cited
UNITED STATES PATENTS

| | | | |
|---|---|---|---|
| 749,854 | 1/1904 | Fahrney | 128/2.05 P |
| 2,658,505 | 10/1953 | Sheer | 128/2.05 P |
| 3,154,066 | 10/1964 | Grindheim et al. | 128/2.05 P |
| 3,154,067 | 10/1964 | Stenstrom et al. | 128/2.05 P |
| 3,176,681 | 4/1965 | Smith | 128/2.05 P |
| 3,442,263 | 5/1969 | Pascaud | 128/2.05 P |
| 3,525,810 | 8/1970 | Adler | 128/2.05 S |
| 3,646,931 | 3/1972 | Phelps et al. | 128/2.05 P |

OTHER PUBLICATIONS

Coleman, "Portable Heart Sound Recording System," Am. J. of Med. Electronics, July–September, 1964, pp. 192–198.

*Primary Examiner*—Richard A. Gaudet
*Assistant Examiner*—Lee S. Cohen
*Attorney, Agent, or Firm*—Edwin A. Oser

[57] ABSTRACT

An instrument for measuring the pulse contour of a warm-blooded animal and particularly of a human being. The instrument is of the non-invasive type and includes a mechanical interferometer which responds to the differential movement of two adjacent parts of the flesh of the person whose pulse is to be measured. The interferometer preferably has a pivoted arm with two protruding prongs, one of which is put over an artery. A transducer such as a piezoelectric crystal transforms the mechanical motion into an electrical signal which is then amplified by a differential amplifier to minimize electrical noise.

25 Claims, 12 Drawing Figures

PULSE CONTOUR MEASURING INSTRUMENT

BACKGROUND OF THE INVENTION

This invention relates generally to measuring instruments and particularly relates to a sphygmomonometer for measuring the pulse contour of a warm-blooded animal and particularly a human being.

Various instruments have been proposed in the past for measuring the precise pulse contour of a warm-blooded animal or human being. Among these instruments are invasive instruments such as an intra-arterial catheter. Such instruments are capable of measuring directly the aortic pressure pulse. They may be positioned adjacent the heart to measure the operation of the aorta valve and the like.

However, for ordinary diagnostic purposes, invasive instruments may be neither desirable nor practical. Therefore, various other instruments have been devised for measuring the pulse in the artery of say, a human being. These instruments are typified by a pulse motion sensor manufactured by Hewlett Packard and designated APT 16-1. This instrument measures simply the surface curvature.

Another instrument which has been used in the past, primarily for determining the pulse rate, is also manufactured by Hewlett Packard, Type 14011 A. This instrument is primarily a microphone. It does not really measure the pulse contour. The diaphragm of the instrument has a relatively large area so that it integrates the surface curvature to obtain an average measurement. Also, due to its mechanical properties, the instrument has a low frequency response, that is it operates like a low-pass filter to eliminate the high frequency response which would yield details of the pulse shape. The response of this instrument could, of course, be improved by making the area of the diaphragm small enough: however, in that case the diaphragm would be too small to transmit the pressure.

It has recently been recognized that the arterial pulse and changes thereof are an indication of disease and that it can be used for diagnostic purposes. In this connection reference is made to a paper published by Dr. Michael F. O'Rourke which appears in American Heart Journal, Volume 82, Number 5, pages 687–702, November 1971 under the title "The Arterial Pulse in Health and Disease".

As pointed out in this paper, the pulse reflects disease of the heart and arteries. The entire arterial system may be viewed as a hydraulic system having a pump and a plurality of flexible pipes or arteries. Obviously, variations in pressure will indicate changes of the arterial system. For this reason te arterial pressure wave has been studied in detail and conclusions have been drawn from its shape or its variations from the norm. Particularly practitioners of acupuncture are interested in variations of the pulse shape at different points of the body or particularly at the left and right-hand radial arteries. It is even possible to use frequency analysis or Fourier analysis of the waveshapes to derive a mathematical model which might lead to better diagnosis.

It is accordingly an object of the present invention to provide a non-invasive pulse contour measuring instrument which overcomes the drawbacks of prior instruments.

Another object of the present invention is to provide an instrument which has a high frequency response and which is substantially immune to mechanical noise and only amplifies differential motions between a point-like area under an artery and an adjacent area, thereby to eliminate motions or tremors of the flesh.

A further object of the present invention is to provide an instrument capable of measuring pulse contours over a wide range of static pressures of the instrument against the artery without biasing the instrument or degrading its sensitivity.

A still further object of the present invention is to provide an instrument of the type discussed which permits to observe localized arterial pulse phenomena at different parts of the body.

SUMMARY OF THE INVENTION

In accordance with the present invention there is provided a pulse contour measuring instrument for measuring the pulse of a warm-blooded animal such as a mammal. Preferably, the instrument is utilized for human beings and will be so described hereinafter. However, it should be realized that it may be used as well for any warm-blooded animal.

The instrument comprises a mechanical interferometer having two spaced supports or fingers which are adapted to be put on the flesh of the person whose pulse is to be measured. A mechanical interferometer may be defined as an instrument which responds to the differential movement of two adjacent portions of the person's flesh. At least one of the supports or fingers of the instrument has a point-like area. This is the finger put over the artery to be measured. As a result the mechanical interferometer responds essentially to variations of the pulse pressure without responding to motions or tremors of the flesh.

A transducer is coupled to the interferometer for transforming the mechanical motion of the interferometer into an electric signal. This may be any suitable transducer such, for example, as a piezoelectric element.

Since the electric signal will be relatively small the signal-to-noise ratio may be unfavorable. Therefore, a differential amplifier is employed which is coupled to the transducer for amplifying the electric signal. In the nature of differential amplifiers it will not amplify the noise which will be substantially equal in the two inputs of the amplifier.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
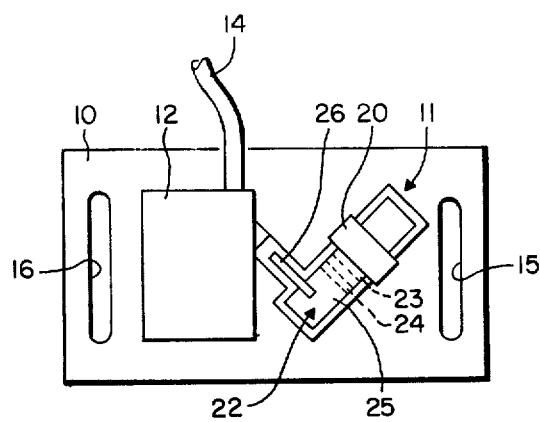
FIG. 1 is a plan view of a preferred embodiment of the instrument of the present invention which is adapted to be worn on a person's wrist.
Figure 2:
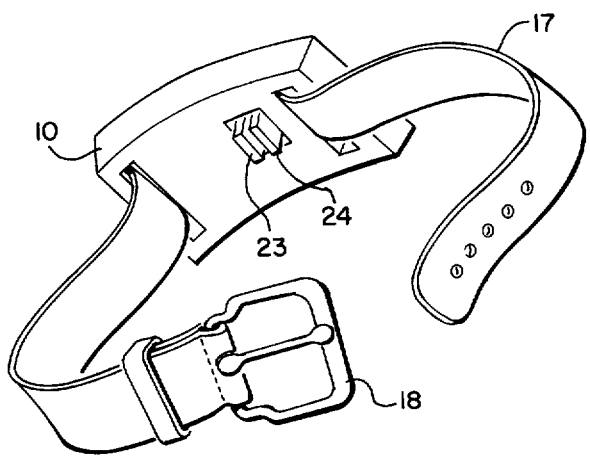
FIG. 2 is a view in perspective of the instrument of FIG. 1 with attached wrist strap and illustrating the projecting fingers to be placed over an artery.
Figure 3:
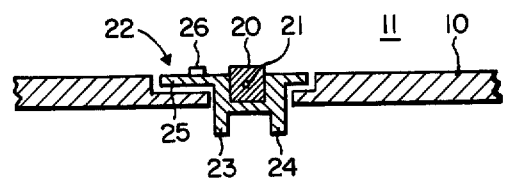
FIG. 3 is a cross-sectional view on enlarged scale of the mechanical subassembly of the instrument of FIG. 1.

Referring now to the drawings wherein like elements are designated by the same reference characters and particularly to FIGS. 1–3, there is illustrated the presently preferred embodiment of the present invention. The instrument includes a housing 10 which may, for example, consist of a plastic frame. It includes a mechanical subassembly forming a mechanical interferometer generally designated 11 and shown particularly in FIG. 3 and an electronic subassembly 12 from which extends a cable 14. The frame or housing 10 may be provided with two longitudinal slots 15 and 16 for passing therethrough a wrist strap 17 with buckle 18. Preferably, as shown in FIG. 2, the frame 10 may be bent or curved to bridge the arm tendons.

The mechanical subassembly or interferometer 11 consists of a yoke 20 which may, for example, consist of metal such as steel and which is secured to the frame 10. The yoke 20 in turn has extending therethrough a bearing pin or pivot 21 on which is mounted an arm 22. The arm 22 may, for example, consist of a plastic material. Thus the mechanical interferometer 11 responds to the differential motion of the artery of the person whose pulse is to be measured and another, possibly large area of the flesh of the person or even of a fixed support.

In accordance with the present invention the arm 22 is provided with two fingers or supports 23 and 24. The fingers or prongs 23 and 24 preferably have substantially point-like areas, that is extremely small areas so that they respond to motion of only a small area of an artery. One of the supports, say 23, may however have a larger area because of its purpose which is to provide a support or to rest on the flesh of the wearer. The prongs 23, 24 will cause the arm 22 to oscillate about the pivot 21 in response to variations of the pulse pressure.

The arm 22 has an extension or portion 25. An electromechanical transducer 26 which may be of elongated shape as shown in FIG. 1, has one end portion resting on or over the extension 25 of the arm 22 while its other end is secured to the frame 10. Accordingly, the transducer 26 will transform the differential motion or oscillation of the two prongs 23, 24 into an electrical signal which may then be further amplified.

The transducer 26 may be a magnetic sensor, a strain gage of the resistive type or a capacitive pickup. Preferably, however, the transducer 26 is a piezoelectric transducer. Such piezoelectric transducer are well known in the art. They may consist of piezoelectric crystals or ferroelectric ceramics such as barium titanate or lead titanate zirconate, the latter being known as PZT. Such piezoelectric transducers are well known and are readily available commercially. Some of these electromechanical transducers produce a linear output signal in response to a small mechanical motion; others generate an output signal which is a derivation of the input signal.

Figure 4:
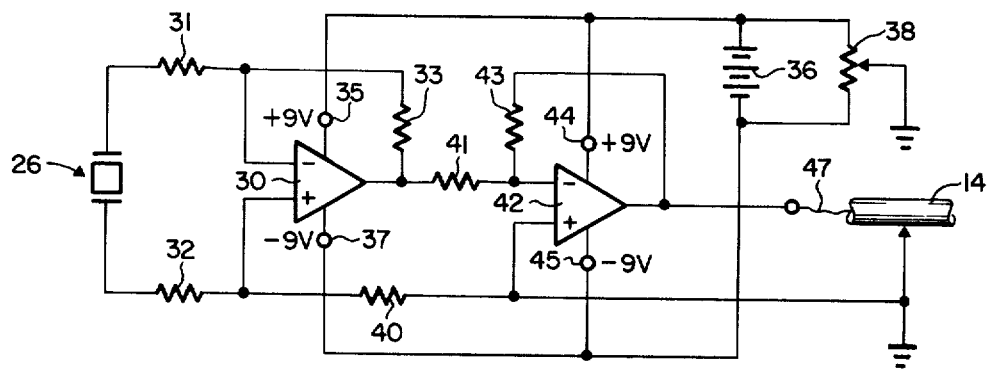
FIG. 4 is a circuit diagram of the piezoelectric transducer of the instrument and its differential amplifier and impedance transformer.

The electronic subassembly 12 is shown by way of example in FIG. 4 to which reference is now made. The transducer 26 has been shown schematically as a piezoelectric crystal. It is connected to a differential amplifier 30 whic is an operational amplifier having two inputs. One of the inputs is connected to one electrode of the crystal 26 through a resistor 31 while the other electrode of the crystal is connected to the second input of the differential amplifier output to the input to provide a negative feedback as is conventional for differential operational amplifiers. The differential amplifier 30 may also be viewed as an impedance matching device to match the impedance of the crystal 26 to that of the output cable 14.

In case the electric output signal is not a direct linear function of the mechanical oscillation of arm 22, the amplifier 30 may be used as an integrating or shaping amplifier. In other words the amplifier 30 may have the necessary properties such as an integrating amplifier to insure a linear relationship between the pulse contour to be measured and the resulting electric output signal.

The differential amplifier 30 has one power input terminal 35 to supply a positive voltage from battery 36. The negative terminal of the battery 36 is connected to the other power terminal 37 of the amplifier 30. A resistor 38 is connected across battery 36 and is center tapped to ground so that the two inputs to the amplifier are respectively positive and negative with respect to ground.

The positive input of the differential amplifier 30 is connected to ground through a resistor 40. A coupling resistor 41 connects the output of differential amplifier 30 to one of the inputs of a second operational amplifier 42 having a feedback resistor 43. The second input of the operational amplifier 42 is grounded. Its two power inputs 44 and 45 are connected respectively to the positive and negative terminals of battery 36. Finally, the output of the operational amplifier 42 is connected to center conductor 47 of the cable 14 having its outer sheath grounded as shown.

The instrument described in FIGS. 1–4 operates in the following manner. The housing of frame 10 is strapped to the wrist of a person in such a manner that one of the prongs 23 or 24 is positioned above an artery. The mechanical interferometer formed by the arm 22 eliminate mechanical joint motions of the two prongs 23 and 24 but responds to differential motions thereof. This differential motion is transformed into an electric signal by the transducer 26.

The electric signal is now impressed on the differential amplifier 30 which again does not respond to equal voltages which may exist at its two input terminals. It will, however, respond to differential voltages at the two inputs which represent the desired electrical signal. This signal is now amplified in succession by the two operational amplifiers 30 and 42 to provide a low output impedance corresponding to that of the shielded or coaxial cable 14.

It will be understood that the circuit specifications of the amplifier of the invention illustrated in FIG. 4 may vary according to the design for any particular application. The following circuit specifications are included, by way of example only, as suitable for a piezoelectric ceramic element for measuring human pulse contours.

| Resistor 31 | 100 k ohms |
| Resistor 32 | 100 k ohms |
| Resistor 33 | 1 meg ohms |
| Resistor 40 | 1 meg ohms |
| Resistor 41 | 1 k ohms |
| Resistor 43 | 100 k ohms |
| Amplifier 30 | Operational amplifier, gain 10 |
| Amplifier 42 | Operational amplifier, gain 100 |

It may be noted that the bias voltages supplied by the battery 36 may also be fed to the instrument by either the same cable 14 or a separate cable.

Figure 5:
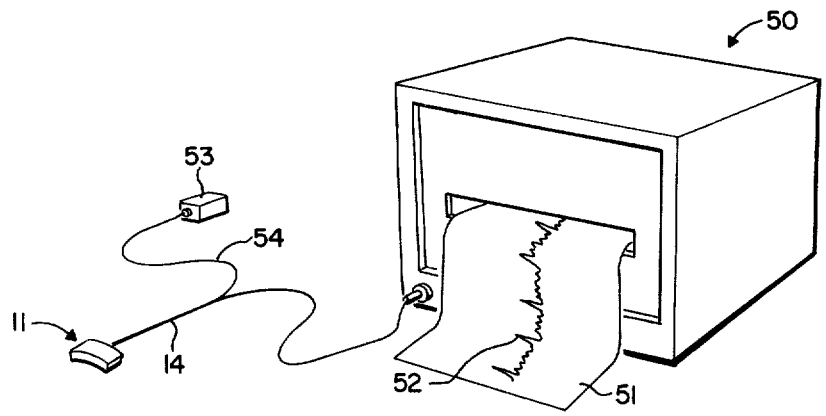
FIG. 5 is a view in perspective of a chart recorder with attached cable which may form part of the instrument of FIGS. 1–3.
Figure 6:
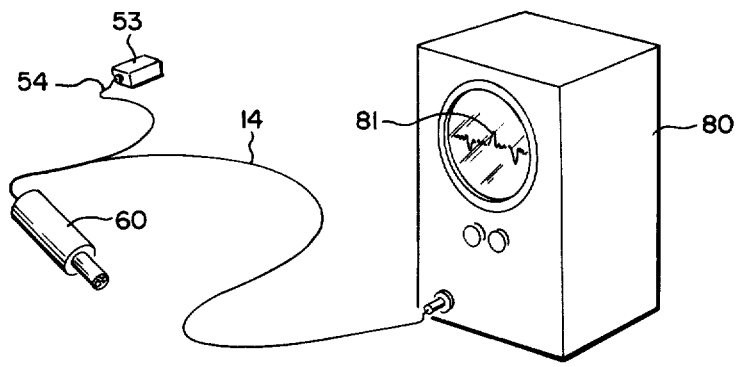
FIG. 6 is a view in perspective of an oscilloscope and cable and attached instrument shown in detail in FIGS. 7–10.
Figure 7:
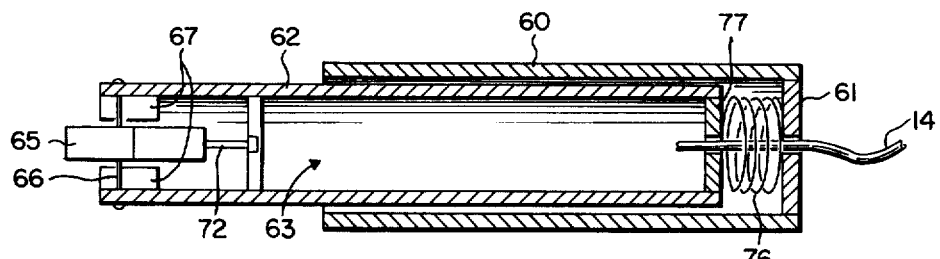
FIG. 7 is a cross-sectional view of another instrument embodying the present invention and adapted for measurement of the arterial pulse at different parts of the body.
Figure 8:
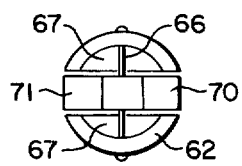
FIG. 8 is an end elevational view of the instrument of FIG. 8 showing particularly the spaced fingers forming part of the mechanical interferometer.
Figure 9:
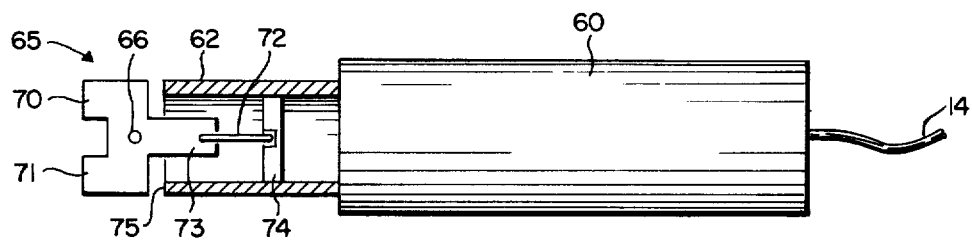
FIG. 9 is a side elevational view of the instrument of FIG. 7, partly in section.
Figure 10:
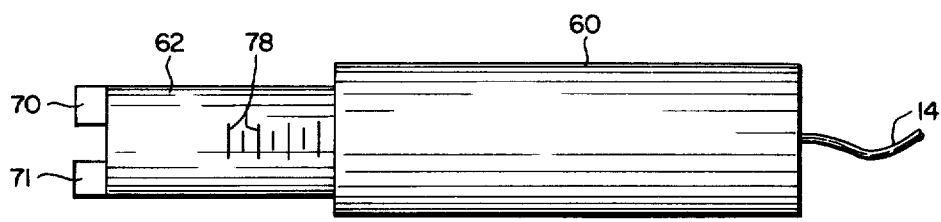
FIG. 10 is a side elevational view similar to that of FIG. 9, but rotated through 90°.

The instrument 11 of FIGS. 1–3 may be connected by a cable 14 to a conventional chart recorder 50 illustrated in FIG. 5 and having a paper strip 51 on which is recorded a pulse trace 52. This will, of course, furnish a permanent record of the pulse contour of the person being measured. It will also be noted in FIG. 5 that there is illustrated a box 53 which may house the battery 38 and a cable 54 to supply the bias voltages to the instrument 11.

Figure 12:
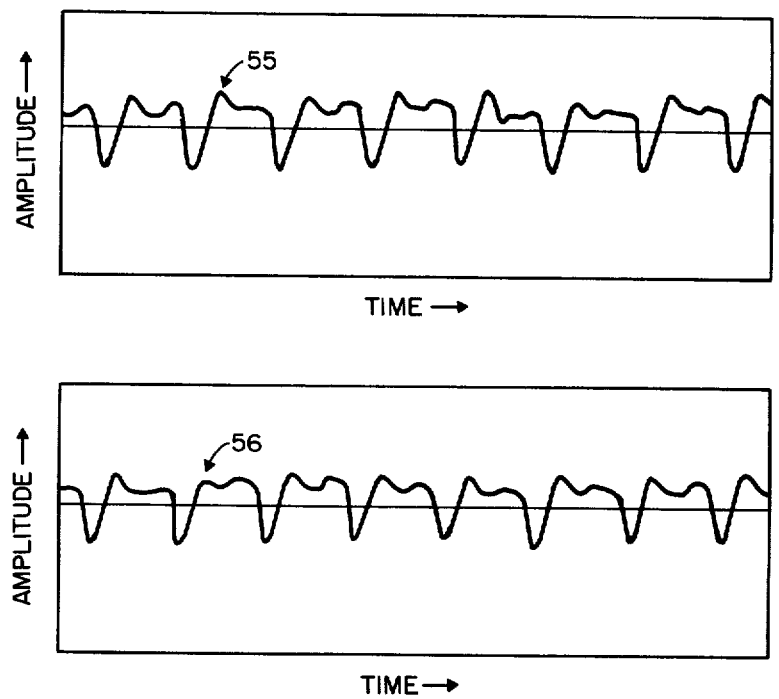
FIG. 12 illustrates two pulse charts taken with the instrument of the invention where pulse amplitude is plotted as a function of time.

FIG. 12 to which reference is now made shows two pulse contour traces 55 and 56 which have actually been measured with the instrument of FIGS. 1–3. Both traces are recorded as a function of time and both traces show the amplitude of the pulse contour. The details of the pulse contours are clearly made evident and are available in a form suitable for diagnostic purposes.

It will may no always be possible to strip the instrument of FIGS. 1–3 to the portion of the body of the person whose pulse is to be measured. Thus it may be desirable to measure the pulse contour at the person's neck, ear or near the heart region. In that case the instrument illustrated in FIGS. 7–10 may be used. As shown in FIGS. 7–10, the instrument is elongated and of substantially cylindrical form to facilitate holding of the instrument in the hand of a doctor or nurse. As shown particularly in FIGS. 7, there is provided an outer cylindrical tube 60 closed at one end by a disk 61 having a central aperture to permit the cable 14 to extend therethrough. Slidable within the outer tube 60 is an inner tube 62 into which the cable 14 extends through an aperture. The inner tube has a portion 63 in which the electric subassembly may be housed. The mechanical subassembly forming the mechanical interferometer again consists of an arm 65 pivoted by a bearing pin 66 extending through the inner tube 62 and spaced by a pair of spacer elements 67, The arm 65 again has two prongs 70 and 71 which serve the same purpose as the prongs previously described.

An electromechanical transducer which may again be a piezoelectric element is shown at 72. It has one portion resting on an extension 73 of the arm 65 while its other portion rests on a strut 74 fixed to and extending across the inner tube 62. The end 75 of the inner tube 62 forms a mechanical stop for the arm 65.

Since the instrument of FIGS. 7–10 cannot be strapped to the body of the wearer it must be pushed against the flesh. Therefore, preferably a compression spring 76 is disposed between the disk 61 of the outer tube 60 and the corresponding disk 77 closing the rear end of the inner tube 62. A scale or gradations 78 may be provided on the inner tube 62 to indicate the degree of pressure say in ounces with which the instrument is pushed against the flesh. This pressure is limited by the action of the stop 75. This instrument permits concurrent determination of various static pressures of the prongs against the artery. It is furthermore noted that the static pressure is not sensed by the mechanical interferometer because it is distributed between both prongs and the net effect is to not affect the electromechanical transducer.

The instrument of FIGS. 7–10 may also be connected to the chart recorder 50 of FIG. 5. Alternatively, the instrument 60 of FIGS. 7–10 may be connected by its cable 14 to an oscilloscope 80 which will exhibit visually a trace 81 of the pulse contour. Again the necessary bias voltage may be supplied by the box 53 housing a battery and a cable 54. It will be understood, of course, that an oscilloscope 80 will not provide a permanent record, but only a visual display. However, it is well understood that the trace 81 may be photographed or otherwise permanently recorded.

It will also be understood that the instrument 11 may be attached to the oscilloscope 80 instead of the instrument of FIGS. 7–10. In some cases it may be desirable to use simultaneously both the oscilloscope 80 and the chart recorder 50 to provide both a permanent record and a visual display. This may be desirable when the person is a patent under constant observation. In that case the chart recorder 50 or the oscilloscope 80 or both may be located in another room for observation by a nurse or physician. This is made possible because the electric signal representing the pulse contour is amplified before it is impressed on the cable 14 so that it is no longer affected by noise.

It will also be understood that it is feasible to use a plurality of pulse measuring instruments of the type described herein simultaneously. Each instrument may be placed on a different spot along an artery of a person. This makes it possible, for example, to select the instrument exhibiting the best or clearest pulse contour which may then be recorded.

Figure 11:
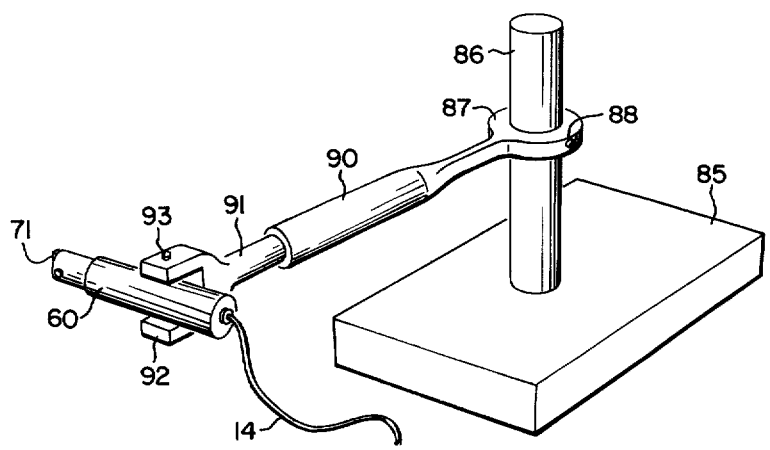
FIG. 11 is a view in perspective of a holder for the instrument of FIGS. 7–10 and including the instrument to minimize the effects of mechanical noise due to tremors of the person holding the instrument.

It will be evident from what has been said before that the instrument of FIGS. 7–10 does not eliminate mechanical noise caused by the varying pressure of the holder such as the doctor or nurse. Thus it is impossible to completely eliminate noise caused by tremors of the hand or involuntary motions. In order to minimize these effects it may be desirable to utilize a holder such as shown in FIG. 11. The holder of FIG. 11 has a base 85 from which extends a post 86 which serves as a bearing for a ring 87 which may be locked by a lock nut 88. An arm 90 extends from the ring 87 and provides a bearing for a rotatable shaft 91 extending therefrom. It terminates in a U-shaped or fork-like frame 92 providing an axis formed by a pin or pivot 93 for holding the instrument 60. The two prongs 70 may be rotatably adjusted about an axis extending through the instrument 60. The two prongs 70 and 71 extend through a substantially vertically inclined plane while the holder holds the instrument 60 gimballed about an inclined axis while additionally the shaft 91 may be rotated.

Thus basically the instrument 60 is held in a position which allows the prongs 70 and 71 to contact the arm essentially normally and at the points desired.

With the holder of FIG. 11 the instrument of FIGS. 7–10 will substantially eliminate the noise caused by the holder of the instrument, that is by hand tremors or involuntary motion. Thus, the instrument will substantially minimize or eliminate the three noise forces (1) the noise caused by the holder, (2) the noise caused by the person whose pulse is to be measured, that is by the tremors of his flesh. Finally, (3) it will eliminate or minimize the electrical noise.

There has thus been disclosed an arterial pulse transducer for measuring pulse contours. The instrument has a high frequency response due to the wideband differential amplifier utilized. On the other hand, the instrument is provided with a mechanical interferometer which responds only to differential motion and thus minimizes mechanical noise. A preferred form of the instrument may be strapped to the wrist or the arm of the wearer. Another instrument permits measurements at all parts of the body which may not permit strapping of an instrument thereto. In order to minimize the mechanical noise which may be contributed by the person applying the instrument a holder has been disclosed which will eliminate such mechanical noises. Since the instrument relies on a substantially point-like area for measuring, it permits to obtain details of the pulse contour which could not be obtained in the past with known non-invasive instruments.

What is claimed is:

1. A pulse contour measuring instrument for measuring the pulse of a mammal comprising:
    a. a balanced mechanical interferometer including a member having a first and a second support providing substantially equal resistance to motion, at least one of said supports being adapted to be placed on the flesh of the mammal for measuring its pulse, one of said supports having a point-like area adapted to be placed over an artery, whereby said interferometer responds essentially only to variations of the pulse pressure without responding to motions or tremors of the flesh;
    b. means for supporting said member to detect the motion of said supports and including means for supporting said interferometer against the mammal;
    c. transducer means coupled to said member for transforming the mechanical motion of said member into a single electric signal; and
    d. an amplifier coupled to said transducer means for amplifying the electric signal substantially without amplifying electric noise.

2. An instrument as defined in claim 1 wherein means for displaying the electric signal is coupled to said amplifier.

3. An instrument as defined in claim 1 wherein both of said supports have a point-like area.

4. A pulse contour measuring instrument for measuring the pulse of a warm-blooded animal, including a human being, said instrument comprising:
    a. a balanced mechanical interferometer consisting of a member having two spaced supports, at least one of said supports having a point-like area;
    b. pivot means for said member for permitting said member to oscillate about its pivot in response to differential motion of said supports and providing substantially equal resistance to the motion of said member, whereby said member is adapted to be positioned over the flesh of an animal or human being, said one of said supports being adapted to be placed directly over an artery, the pulse of which is to be measured;
    c. means for fixedly supporting said pivot means to permit the motion of said member and including means for supporting said interferometer against the animal;
    d. electromechanical transducer means coupled to said member for generating a single electric signal in response to differential motion of said member about said pivot; and
    e. an amplifier coupled to said transducer means for amplifying the electric signal generated thereby, substantially without amplifying electric noise.

5. An instrument as defined in claim 4 wherein said transducer means is a piezoelectric element.

6. An instrument as defined in claim 4 wherein both of said supports have substantially point-like areas.

7. An instrument as defined in claim 6 wherein means is coupled to said amplifier for displaying the electric signal amplified by said amplifier.

8. An instrument as defined in claim 7 wherein said means for displaying consists of an oscilloscope.

9. An instrument as defined in claim 7 wherein said means for displaying consists of a recorder.

10. An instrument as defined in claim 6 wherein means is provided for varying the static pressure pressing said instrument against the flesh of the animal whose pulse is to be measured without causing a variation of said electric signal.

11. A pulse contour measuring instrument for measuring the pulse of a warmblooded animal including a human being, said instrument comprising:
    a. a housing;
    b. a balanced two-pronged member disposed in said housing with said prongs extending therefrom, said prongs having a substantially point-like area;
    c. pivot means for said two-pronged member journalled in said housing and for permitting said prongs to oscillate about said pivot with substantially balanced resistance to motion, whereby said two-pronged member responds to differential motion of the flesh without substantially responding to joint motion of the two areas contacted by said prongs;
    d. electromechanical transducer means mounted in said housing and in contact with an element extending from said member for generating a single electric signal representative of the differential motion of said member; and
    e. an amplifier disposed in said housing and coupled to said transducer means for generating an amplified electric output signal.

12. An instrument as defined in claim 11 wherein said transducer means consists of a piezoelectric material.

13. An instrument as defined in claim 11 wherein means is provided for securing said housing to the portion of the body, the pulse of which is to be measured.

14. An instrument as defined in claim 11 wherein means is coupled to said amplifier for displaying said output signal.

15. An instrument as defined in claim 14 wherein said means for displaying consists of a recorder.

16. An instrument as defined in claim 14 wherein said means for displaying consists of an oscilloscope.

17. An instrument for measuring pulse contours of a human being, said instrument comprising:
   a. a first substantially cylindrical housing portion being closed at one end;
   b. a second substantially cylindrical housing portion having an open end and having a size to fit within said first housing portion and extending therefrom with said open end being exterior of said first housing portion;
   c. a pivot in the open end of said second housing portion;
   d. a balanced two-pronged element mounted on said pivot, each of said prongs having a substantially point-like area extending from said second housing portion, whereby said prongs present a substantially balanced resistance to motion;
   e. transducer means mounted between an extension of said two-pronged element and said second housing portion for generating a single electric output signal representative of the differential motion of said two-pronged element; and
   f. an amplifier coupled to said transducer means and disposed in said second housing portion for amplifying the signal developed by said transducer.

18. An instrument as defined in claim 17 wherein a spring is disposed between the closed ends of said first and said second housing portions for controlling the pressure exerted by said instrument on the skin of the being, the pulse of which is to be measured.

19. An instrument as defined in claim 17 wherein an oscilloscope is coupled to said amplifier.

20. An instrument as defined in claim 17 wherein a recorder is coupled to said amplifier.

21. An instrument as defined in claim 17 which further includes a holder means for said first housing portion, said holder means having adjustable means to permit said two-pronged element to contact the flesh of the human being substantially normally and at the point where the pulse contour is to be measured, whereby the generator of mechanical noise is minimized.

22. The method of measuring the pulse contour of a mammal comprising the steps of:
   a. detecting a balanced mechanical differential motion between at least one point-like area and a second area on the flesh of the mammal, the pulse of which is to be measured, by placing a balanced member having two spaced supports in contact with the areas whereby motions due to tremors of the flesh are substantially eliminated;
   b. translating the detected differential motion into a single electric signal representative of the pulse contour; and
   c. amplifying the electric signal substantially without amplifying electric noise.

23. The method defined in claim 22 which includes the additional step of displaying the amplified electric signal.

24. The method defined in claim 22 wherein a balanced mechanical interferometer is utilized for detecting the differential motion and which includes the additional step of securing the interferometer to the body of the mammal to substantially eliminate undesired motions between the interferometer and the mammal's body.

25. The method defined in claim 22 which includes the additional step of varying the common pressure exerted on the two areas without varying the balanced mechanical differential motion.

* * * * *